United States Patent
Wu

(10) Patent No.: US 12,380,542 B2
(45) Date of Patent: Aug. 5, 2025

(54) OPTICAL DISTORTION CORRECTION SYSTEM AND METHOD

(71) Applicant: Himax Technologies Limited, Tainan (TW)

(72) Inventor: Tung-Ying Wu, Tainan (TW)

(73) Assignee: Himax Technologies Limited, Tainan (TW)

( * ) Notice: Subject to any disclaimer, the term of this patent is extended or adjusted under 35 U.S.C. 154(b) by 431 days.

(21) Appl. No.: 18/078,852

(22) Filed: Dec. 9, 2022

(65) Prior Publication Data
US 2024/0193746 A1   Jun. 13, 2024

(51) Int. Cl.
*G06T 5/80* (2024.01)
*G02B 27/00* (2006.01)
*G06T 5/70* (2024.01)

(52) U.S. Cl.
CPC .............. *G06T 5/80* (2024.01); *G06T 5/70* (2024.01); *G06T 2207/20024* (2013.01)

(58) Field of Classification Search
CPC ... G06T 5/80; G06T 5/70; G06T 2207/20024; G02B 27/0025
See application file for complete search history.

(56) References Cited

U.S. PATENT DOCUMENTS

| | | | |
|---|---|---|---|
| 8,508,662 B1 * | 8/2013 | Sahu | H04N 7/0142 348/452 |
| 2002/0000988 A1 * | 1/2002 | Nelson | G06T 11/40 345/443 |
| 2004/0201863 A1 * | 10/2004 | Bailey | G06T 3/4023 382/300 |
| 2012/0026368 A1 * | 2/2012 | Cote | G06T 3/4015 348/E9.037 |
| 2013/0223756 A1 * | 8/2013 | Iketani | H04N 7/012 382/260 |

FOREIGN PATENT DOCUMENTS

| | | | | |
|---|---|---|---|---|
| KR | 2009050223 A | * | 5/2009 | ........ G06T 3/4015 |
| TW | 201536053 A | * | 9/2015 | ........ G06T 3/4015 |
| TW | 202101418 A | * | 1/2021 | |
| WO | WO-2021120790 A1 | * | 6/2021 | ........... G06T 5/20 |

* cited by examiner

*Primary Examiner* — John Villecco
*Assistant Examiner* — Kyla Guan-Ping Tiao Allen
(74) *Attorney, Agent, or Firm* — Donald E. Stout; Stout, Uxa & Buyan, LLP

(57) ABSTRACT

An optical distortion correction system includes a correction device that generates correction values according to data from a lens; a weighting device that generates weights for corresponding data according to the correction values; a jag detector that detects a jag in an outline according to the data; a filter that provides a spatial filter when a jag is detected; and a smoothing device that smooths the data by the weights and the spatial filter, thereby resulting in smoothed data.

20 Claims, 5 Drawing Sheets

OPTICAL DISTORTION CORRECTION
SYSTEM AND METHOD

BACKGROUND OF THE INVENTION

1. Field of the Invention

The present invention generally relates to an optical distortion correction system and method, and more particularly to an optical distortion correction system and method capable of preventing a jaggy outline.

2. Description of Related Art

A lens is a transmissive optical device which focuses or disperses a light beam by means of refraction. The lens is commonly used in an optical visual output device such as a display device (e.g., head-up display or HUD) or an image projector.

However, the lens does not form perfect images, and the lens always introduces some degree of distortion or aberration that makes the image an imperfect replica of an object. Optical distortion is a deviation from rectilinear projection such that projected straight lines in a scene no longer remain straight in an image. Distortion correction is therefore required to amend the image.

Many schemes of distortion correction have been proposed to amend the distorted image. Nevertheless, conventional distortion correction schemes suffer jaggy phenomenon with an uneven outline on the image.

A need has thus arisen to propose a novel scheme to overcome drawbacks of the conventional distortion correction schemes.

SUMMARY OF THE INVENTION

In view of the foregoing, it is an object of the embodiment of the present invention to provide an optical distortion correction system and method capable of effectively preventing a jaggy outline.

According to one embodiment, an optical distortion correction system includes a correction device, a weighting device, a jag detector, a filter and a smoothing device. The correction device generates correction values according to data from a lens. The weighting device generates weights for corresponding data according to the correction values. The jag detector detects a jag in an outline according to the data, and the filter provides a spatial filter when a jag is detected. The smoothing device smooths the data by the weights and the spatial filter, thereby resulting in smoothed data.

DETAILED DESCRIPTION OF THE INVENTION

Figure 1:
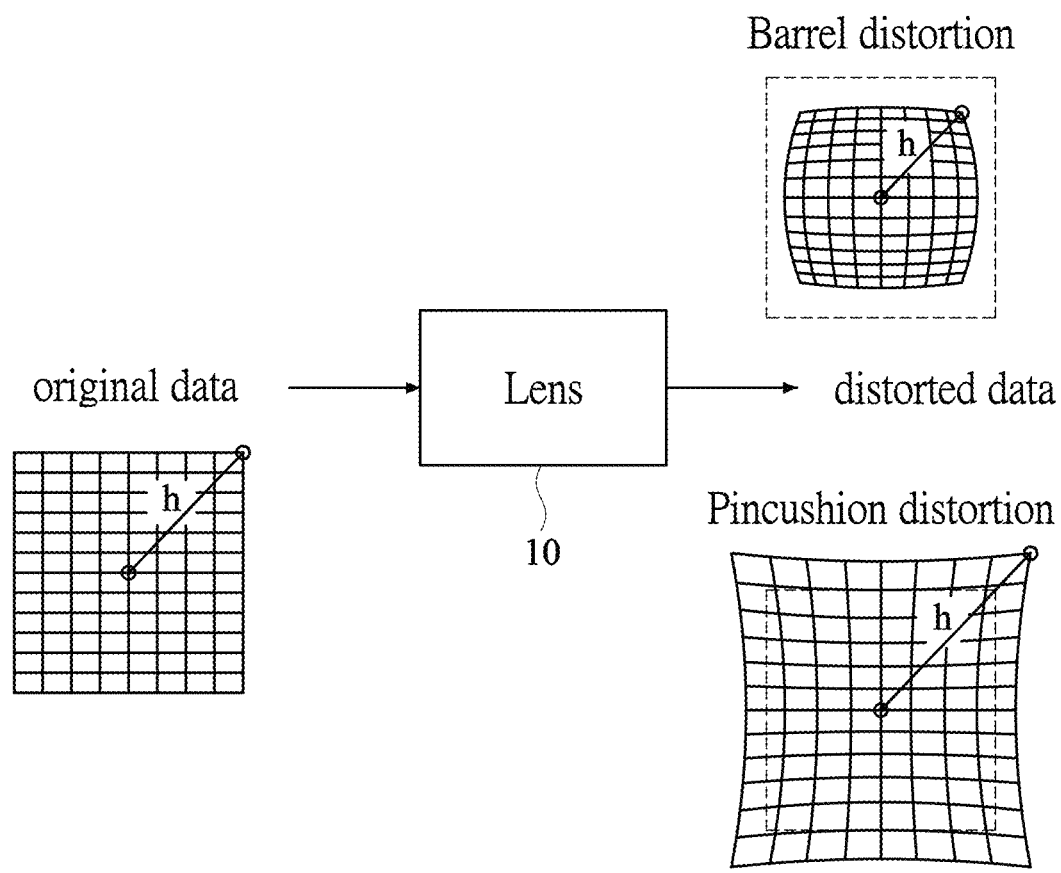
FIG. 1 shows a schematic illustrating optical distortion caused by a lens.

FIG. 1 shows a schematic diagram illustrating optical distortion caused by a lens 10, which is a transmissive optical device that focuses or disperses a light beam by means of refraction, through which a light beam of original (image) data (or pixels) passes. The lens 10 may be a composing element of an optical visual output device such as a display device (e.g., head-up display or HUD) or an image projector, and the original data may, for example, be provided by a controller such as a timing controller of a display device. Due to characteristics of the lens 10, the light beam of the original data may suffer optical distortion, thereby resulting in distorted (image) data.

As shown in FIG. 1, the optical (geometric) distortions may be usually classified as either barrel distortion or pincushion distortion. Specifically, in barrel distortion, image magnification decreases with distance h from the optical axis. Concave spherical lenses tend to have barrel distortion. In pincushion distortion, image magnification increases with the distance h from the optical axis. Convex spherical lenses tend to have pincushion distortion.

Figure 2:
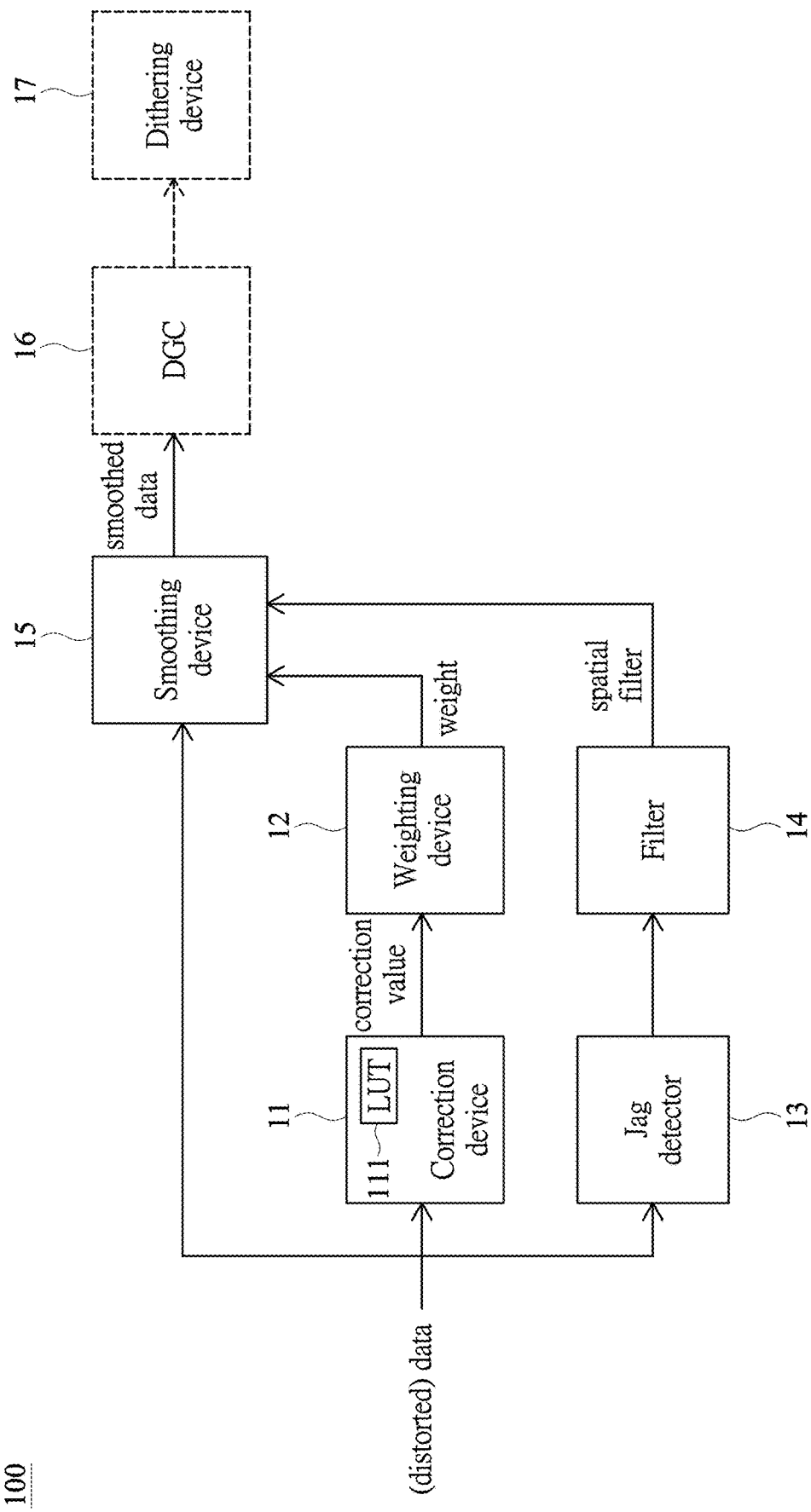
FIG. 2 shows a block diagram illustrating an optical distortion correction system adaptable to an optical visual output device according to one embodiment of the present invention.
Figure 3:
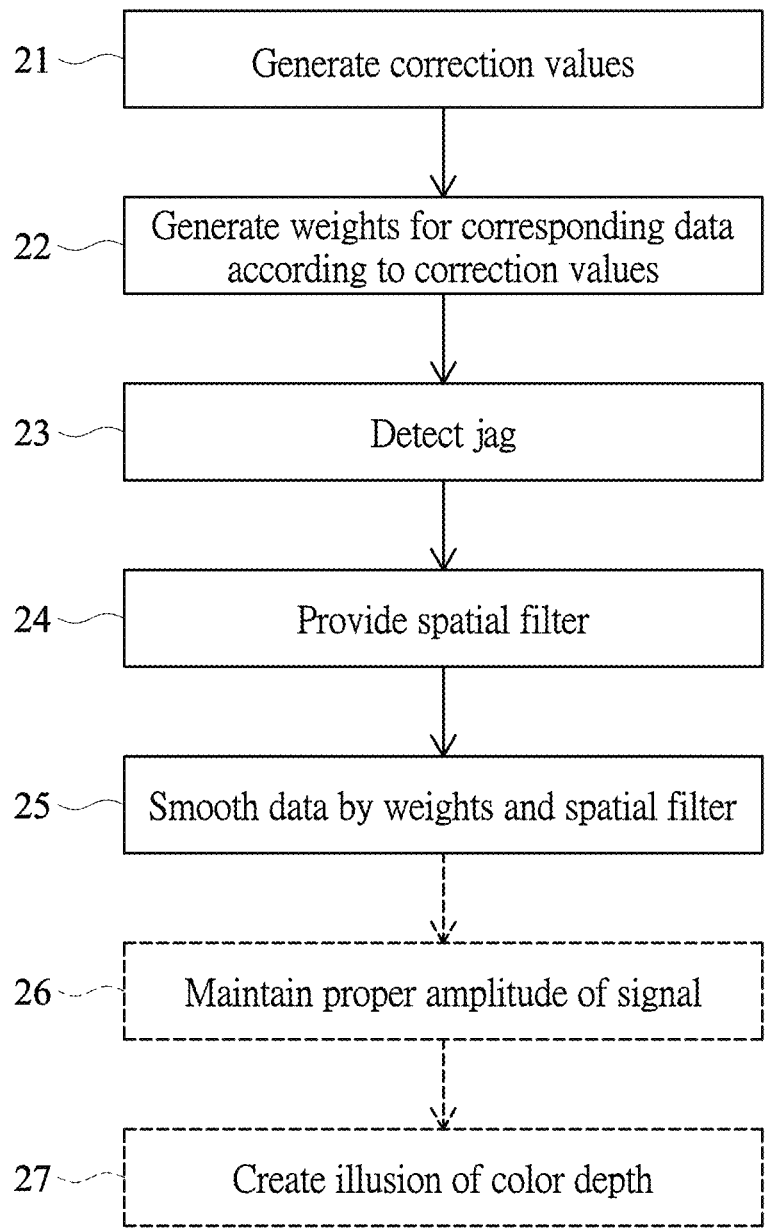
FIG. 3 shows a flow diagram illustrating an optical distortion correction method adaptable to the optical distortion correction system of FIG. 2.

FIG. 2 shows a block diagram illustrating an optical distortion correction system 100 adaptable to an optical visual output device such as a display device (e.g., head-up display or HUD) or an image projector according to one embodiment of the present invention, and FIG. 3 shows a flow diagram illustrating an optical distortion correction method 200 adaptable to the optical distortion correction system 100 of FIG. 2. The blocks of FIG. 2 and steps of FIG. 3 may be implemented by hardware, software or their combinations, for example, performed in a digital image processor.

Specifically, the optical distortion correction system 100 ("correction system" hereinafter) may include a correction device 11 configured to generate correction values according to the (distorted) data (from the lens 10) (step 21), the correction values being used to correct the optical distortion (caused by the lens 10). In the embodiment, the correction values each may represent an amount of pixels to be deserted (or abandoned) for each line (e.g., horizontal row or vertical column) before being sent to the optical visual output device (e.g., display device or image projector). In the specification, the amount of pixels to be deserted is also called throw pixel. In the embodiment, the correction values may construct a lookup table (LUT) 111 to be stored in a memory device.

Figure 4:
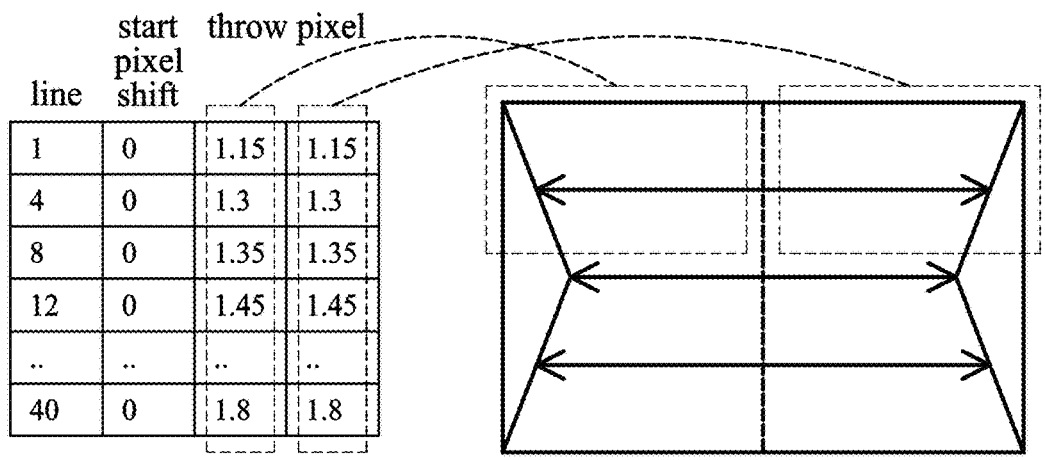
FIG. 4 shows an exemplary lookup table composed of partial correction values (generated by the correction device of FIG. 2) and corresponding distorted data (of an image)

FIG. 4 shows an exemplary lookup table 111 composed of partial correction values (generated by the correction device 11 of FIG. 2) and corresponding distorted data (of an image). Specifically, in the embodiment, the entire image (to be displayed or projected) is divided into two sections with corresponding correction values. For example, 1.15 pixel should be deserted for (each section of) the first line, 1.3 pixel should be deserted for (each section of) the second line, etc. Generally speaking, the more optical distortion a line has, the greater the corresponding correction value is. Therefore, more correction can be made at the line with more optical distortion. In one embodiment, the lookup table 111 may further include start pixel shifts each representing a position of a start pixel for a corresponding line.

Figure 5:
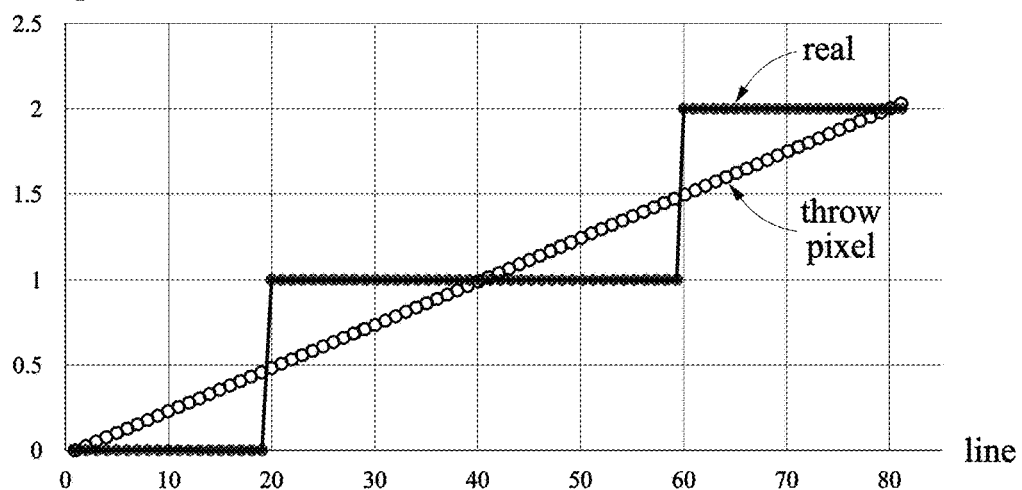
FIG. 5 shows the integer down-sampling computation as executed in the correction device of FIG. 2.
Figure 6:
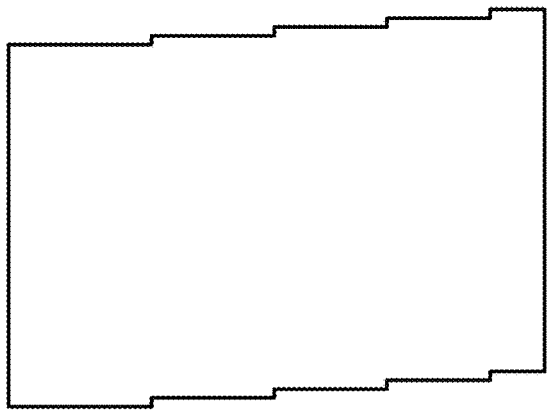
FIG. 6 shows an exemplary image with a jaggy outline with jags.

It is noted, however, that the (real) amount of pixels to be deserted should be an exact whole number (i.e., integer) in real practice. For example, one (1) pixel is deserted instead of 1.15 pixel as denoted by the corresponding throw pixel. FIG. 5 shows the integer down-sampling computation as executed in the correction device 11 of FIG. 2. Due to the deviation between the real amount of pixels to be deserted and the throw pixel as generated by the correction device 11, an outline of the image may become jaggy with a plurality of jags or sharp points. FIG. 6 shows an exemplary image with a jaggy outline with jags.

According to one aspect of the embodiment, the correction system 100 may include a weighting device 12 configured to generate weights for corresponding (distorted) data according to the correction values (step 22). Specifically, in the embodiment, a weight is determined according to a fractional part (or decimal part) of a corresponding correction value (of a pixel). In one specific embodiment, the weight may be determined as follows:

weight=fractional part if fractional part>=0.5 weight=fractional part+0.5 if fractional part<0.5

Figure 7A:
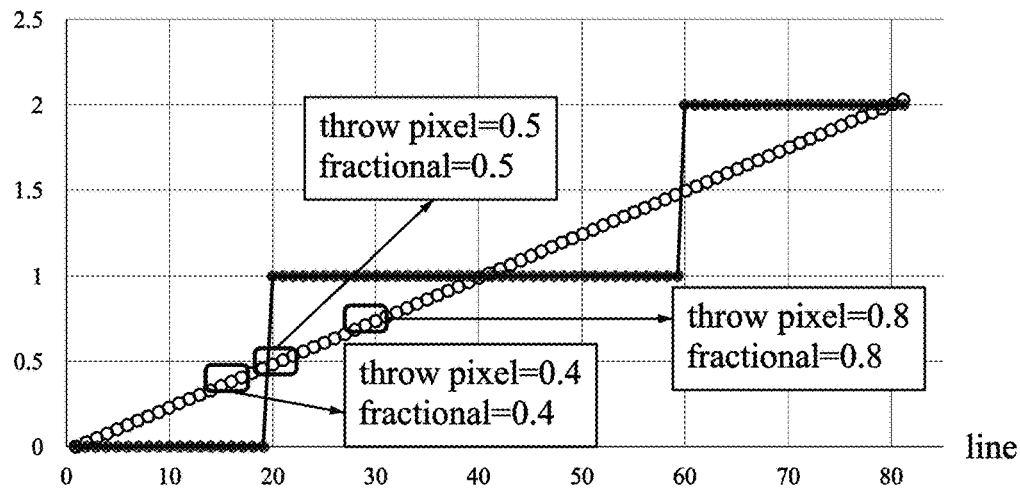
FIG. 7A shows exemplary throw pixels and the corresponding fractional parts.
Figure 7B:
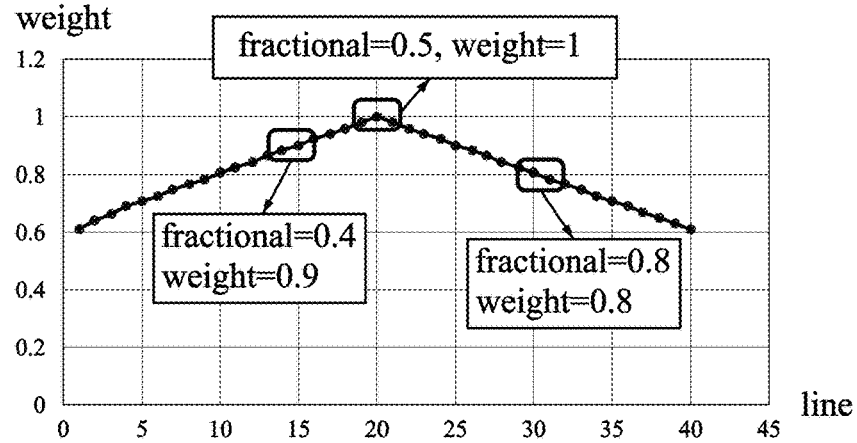
FIG. 7B shows exemplary weights determined according to the fractional parts of FIG. 7A.

FIG. 7A shows exemplary throw pixels and the corresponding fractional parts, and FIG. 7B shows exemplary weights determined according to the fractional parts of FIG. 7A.

According to another aspect of the embodiment, the correction system 100 may include a jag detector 13 configured to detect a jag (or sharp point) in the outline according to the (distorted) data (step 23). In one embodiment, the jag may be detected as follows:

$JagL=|(Data(x,y)-Data(x-1,y))|$ $JagR=|(Data(x,y)-Data(x+1,y))|$

Jag=1 if Max(JagL,JagR)>=th where Data represents the distorted data, Max( ) represents a function that returns a largest value of inputs JagL and JagR, th represents a predetermined threshold, and a jag is detected when Jag=1.

Figure 8:
FIG. 8 shows an exemplary spatial filter with a kernel composed of five spatial weights.

The correction system 100 of the embodiment may include a filter 14 configured to provide a spatial filter (step 24) when a jag is detected by the jag detector 13. Specifically, the spatial filter (provided by the filter 14) may include a kernel (also called mask), which is a matrix, and a convolution may be performed between the kernel and the data (of the image). The convolution is a process of adding each element of the image to its local neighbors, weighted by the kernel as conventionally done and details of which are omitted for brevity. FIG. 8 shows an exemplary spatial filter with a kernel composed of five spatial weights.

According to a further aspect of the embodiment, the correction system 100 may include a smoothing device 15 configured to smooth the (distorted) data by the weights (generated by the weighting device 12) and the spatial filter (provided by the spatial filter 14), thereby resulting in smoothed data without jaggy outline (step 25). Specifically, the smoothing device 15 first performs convolution between the kernel of the spatial filter and the (distorted) data, a result of the convolution is then weighted by a corresponding weight (generated by the weighting device 12). One example performed by the smoothing device 15 is shown below:

$SPF=[SPF1\ SPF2\ SPF3\ SPF4\ SPF5]=[0.1\ 0.2\ 0.4\ 0.2\ 0.1]$ smoothed data(x,y)=Weight*(Data(x,y-2)*SPF1+Data(x,y-1)*SPF2+Data(x,y)*SPF3+Data(x,y+1)*SPF4+Data(x,y+2)*SPF5)

where SPF represents spatial filter, Weight represents the weight generated by the weighting device 12, and Data represents the (distorted) data.

The correction system 100 of the embodiment may optionally further include a digital gain controller (DGC) 16 configured to maintain a proper amplitude (to be within a predetermined range) of a signal representing the smoothed data (step 26). The correction system 100 of the embodiment may optionally further include a dithering device 17 configured to create illusion of color depth in the image display of the smoothed data (step 27).

Although specific embodiments have been illustrated and described, it will be appreciated by those skilled in the art that various modifications may be made without departing from the scope of the present invention, which is intended to be limited solely by the appended claims.

What is claimed is:

1. An optical distortion correction system, comprising:
   a correction device that generates correction values according to data from a lens;
   a weighting device that generates weights for corresponding data according to the correction values;
   a jag detector that detects a jag in an outline according to the data;
   a filter that provides a spatial filter when a jag is detected; and
   a smoothing device that smooths the data by the weights and the spatial filter, thereby resulting in smoothed data.

2. The system of claim 1, wherein the correction values each represent an amount of pixels to be deserted for each line.

3. The system of claim 1, wherein the correction values construct a lookup table to be stored in a memory device.

4. The system of claim 3, wherein the lookup table further comprises start pixel shifts each representing a position of a start pixel for a corresponding line.

5. The system of claim 1, wherein a weight is determined according to a fractional part of a corresponding correction value.

6. The system of claim 5, wherein the weight is determined as follows:

weight=fractional part if fractional part>=0.5 weight=fractional part+0.5 if fractional part<0.

7. The system of claim 1, wherein the jag is detected as follows:

$JagL=|(Data(x,y)-Data(x-1,y))|$ $JagR=|(Data(x,y)-Data(x+1,y))|$

Jag=1 if Max(JagL,JagR)>=th where Data represents the data, Max( ) represents a function that returns a largest value of inputs JagL and JagR, th represents a predetermined threshold, and the jag is detected when Jag=1.

8. The system of claim 1, wherein the smoothing device performs convolution between a kernel of the spatial filter and the data, a result of the convolution is then weighted by a corresponding weight generated by the weighting device.

9. The system of claim 1, further comprising: a digital gain controller that maintains a proper amplitude to be within a predetermined range of a signal representing the smoothed data.

10. The system of claim 1, wherein the lens is a composing element of an optical visual output device.

11. An optical distortion correction method, comprising:
generating correction values according to data from a lens;
generating weights for corresponding data according to the correction values;
detecting a jag in an outline according to the data;
providing a spatial filter when a jag is detected; and
smoothing the data by the weights and the spatial filter, thereby resulting in smoothed data.

12. The method of claim 11, wherein the correction values each represent an amount of pixels to be deserted for each line.

13. The method of claim 11, wherein the correction values construct a lookup table to be stored in a memory device.

14. The method of claim 13, wherein the lookup table further comprises start pixel shifts each representing a position of a start pixel for a corresponding line.

15. The method of claim 11, wherein a weight is determined according to a fractional part of a corresponding correction value.

16. The method of claim 15, wherein the weight is determined as follows:

weight=fractional part if fractional part>=0.5 weight=fractional part+0.5 if fractional part<0.

17. The method of claim 11, wherein the jag is detected as follows:

$JagL=|(Data(x,y)-Data(x-1,y))|$ $JagR=|(Data(x,y)-Data(x+1,y))|$ $Jag=1 \text{ if } Max(JagL,JagR)>=th$ where Data represents the data, Max( ) represents a function that returns a largest value of inputs JagL and JagR, th represents a predetermined threshold, and the jag is detected when Jag=1.

18. The method of claim 11, wherein convolution is performed between a kernel of the spatial filter and the data, a result of the convolution is then weighted by a corresponding weight.

19. The method of claim 11, further comprising:
maintaining a proper amplitude to be within a predetermined range of a signal representing the smoothed data; and
creating illusion of color depth in image display of the smoothed data.

20. The method of claim 11, wherein the lens is a composing element of an optical visual output device.

* * * * *